United States Patent [19]

Haldimann

[11] 4,168,078
[45] Sep. 18, 1979

[54] MOBILE STORAGE AND TRANSPORT UNIT FOR USE IN A SHELF STORAGE SYSTEM

[75] Inventor: Hans R. Haldimann, Zurich, Switzerland

[73] Assignee: Weelpal AG, Zug, Switzerland

[21] Appl. No.: 797,632

[22] Filed: May 17, 1977

[30] Foreign Application Priority Data

May 21, 1976 [CH] Switzerland ............... 06603/76

[51] Int. Cl.² ................................................ B62B 1/08
[52] U.S. Cl. .................................. 280/46; 280/79.1 R
[58] Field of Search ........................... 280/46, 79.1 R

[56] References Cited

U.S. PATENT DOCUMENTS

| 637,650 | 11/1899 | Northrop | 280/79.1 R |
|---|---|---|---|
| 1,740,404 | 12/1929 | Kalberer | 280/46 |
| 2,259,816 | 10/1941 | Harlan | 280/46 |
| 2,266,398 | 12/1941 | Quayle | 280/46 |
| 2,266,399 | 12/1941 | Quayle | 280/46 |
| 3,558,152 | 1/1971 | Miles et al. | 280/79.1 X |

Primary Examiner—Joseph F. Peters, Jr.
Assistant Examiner—Norman L. Stack, Jr.
Attorney, Agent, or Firm—Abraham A. Saffitz

[57] ABSTRACT

A mobile storage and transport rectangular roller unit with a roller and drawbar device for use in a shelf storage system. Each unit is provided with four wheels, one adjacent each corner in a four sided frame. The roller bar is provided with pair of rollers and cooperates with a coupling member of substantially cubic shape which is pivotally mounted on the drawbar. Two transverse cross members are at the front and back of the frame and lie opposite to each other, each formed by an inverted U-section having limbs of unequal length. The coupling member is provided with a top groove to receive the shorter limb of the inverted U-section and is thereby coupled at the shorter limb of the cross member to the four sided frame.

8 Claims, 8 Drawing Figures

MOBILE STORAGE AND TRANSPORT UNIT FOR USE IN A SHELF STORAGE SYSTEM

BACKGROUND OF THE INVENTION

1. Field of the Invention

Palletised goods which are to be stored in a through-run shelf store installation are usually placed onto rolling supports. In this way the stored pallets can roll from the input side of a shelf compartment towards the removal side, be it from its own force as a result of a gradient of the shelf itself, or be it under the action of transporting members. When a loaded pallet, together with its rolling support, has been removed from the shelf compartment and has been set down somewhere, the necessity can arise of shifting this pallet, replacing it or moving it in some other way. If it is a question only of a short movement path, the use of mechanical aids is often inexpedient. On the other hand, loaded pallets often have a great weight, up to 1000 kg, so that an operator can, only with great exertion, shift a loaded rolling support in a straight line. Since the rolling supports, however, have no steerable rollers, displacement along a curved path only with muscle power is not possible without resort to further aids.

2. Description of the Prior Art

For this above stated purpose, i.e. for the manual manoeuvering of heavily-laden rolling supports, it has already been proposed to use so-called lever rollers. These consist substantially of a long lever arm and a short lever arm which extend at an angle to one another. A pair of rollers is situated at the junction of the two lever arms. The short lever arm is engaged under the rolling support and can be raised somewhat, so that the support can be moved relatively easily along a curve.

However, these known lever rollers fail completely in these cases where the free space under the rolling support is very slight, since then either engagement there under of the rolling support is not at all possible, or the lever arm ratio is unfavourable, so that a heavy pallet can no longer be lifted. A further disadvantage of the known lever rollers is to be seen in the fact that often the raised rolling support can unintentionally slide down from the lever roller, which can possibly lead to slippage or even to collapse of the load. Moreover, these known forms of apparatus involve a not inconsiderable risk of accident, since they are unstable, i.e. when the lever arm is let go they whip upwards and, moreover, when not required for use they are inconvenient to stow away.

OBJECT OF THE INVENTION

The object of the present invention is to overcome all these above stated disadvantages of known lever rollers and systems and to provide transportation apparatus for palletised goods which is particularly suitable for use in connection with rolling supports having only slight underneath free space, which supports are nowadays increasingly wide-spread.

SUMMARY OF THE INVENTION

The storage and transport unit in accordance with the invention for palletised goods comprises a rolling support which has substantially a rectangular frame provided with four rollers, as well as a drawbar which is provided with rollers and which can be coupled up to the rolling support. This transportation apparatus is characterised in that two opposite frame sides of the rolling support are formed by an inverted U-section having limbs of unequal length, and in that the drawbar has a coupling member which is substanitally cubic in shape and which is provided with a groove for reception of the shorter limb of the U-section and which is mounted so as to be swingable about an axis extending perpendicular to the axis of rotation of the drawbar rollers.

BRIEF DESCRIPTION OF THE DRAWINGS

One exemplified embodiment of the transport unit of the invention will be described in more detail hereinunder, with reference to the accompanying drawings, in which.

Figures 1, 2:
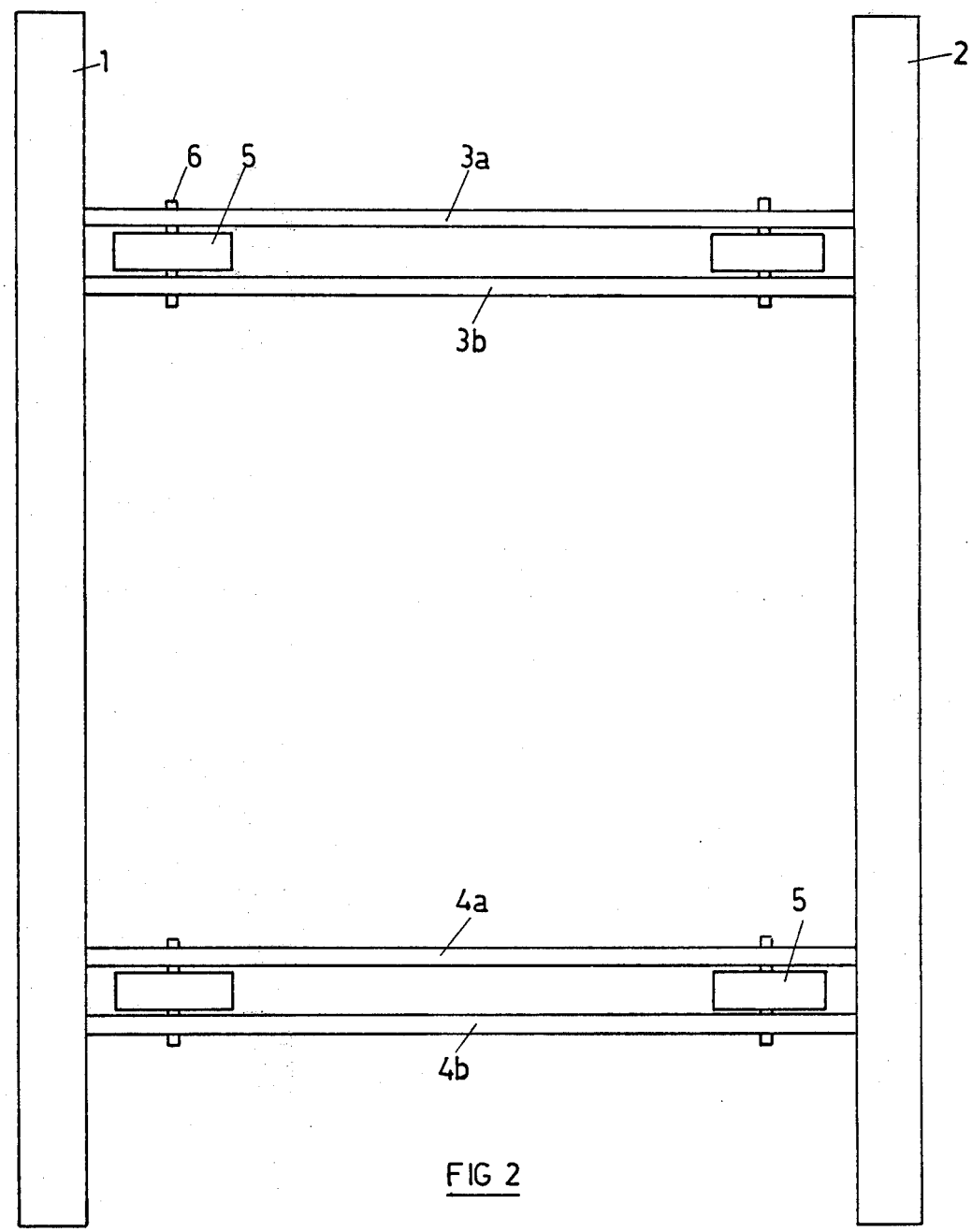
FIG. 1 is a side view of the rolling support of the said embodiment.
FIG. 2 is a plan view of the rolling support of FIG. 1.

Initially reference is made to FIGS. 1 and 2. The unit comprises a four wheeled rolling support which has two inverted transverse U beam traverse members 1 and 2 connected together by two pairs of longitudinal struts 3a, 3b and 4a, 4b. It can be appreciated from FIG. 2 that the longitudinal struts are inset somewhat relative to the ends of the transverse traverse members 1 and 2. The longitudinal struts respectively of each pair are arranged side-by-side at a small spacing apart and serve for the mounting of respective rollers 5, which are rotatably mounted by respective axles 6. The longitudinal struts 3a, 3b, 4a, 4b can be simple square hollow sections which are welded at their ends to the transverse traverses 1 and 2.

Figure 3:
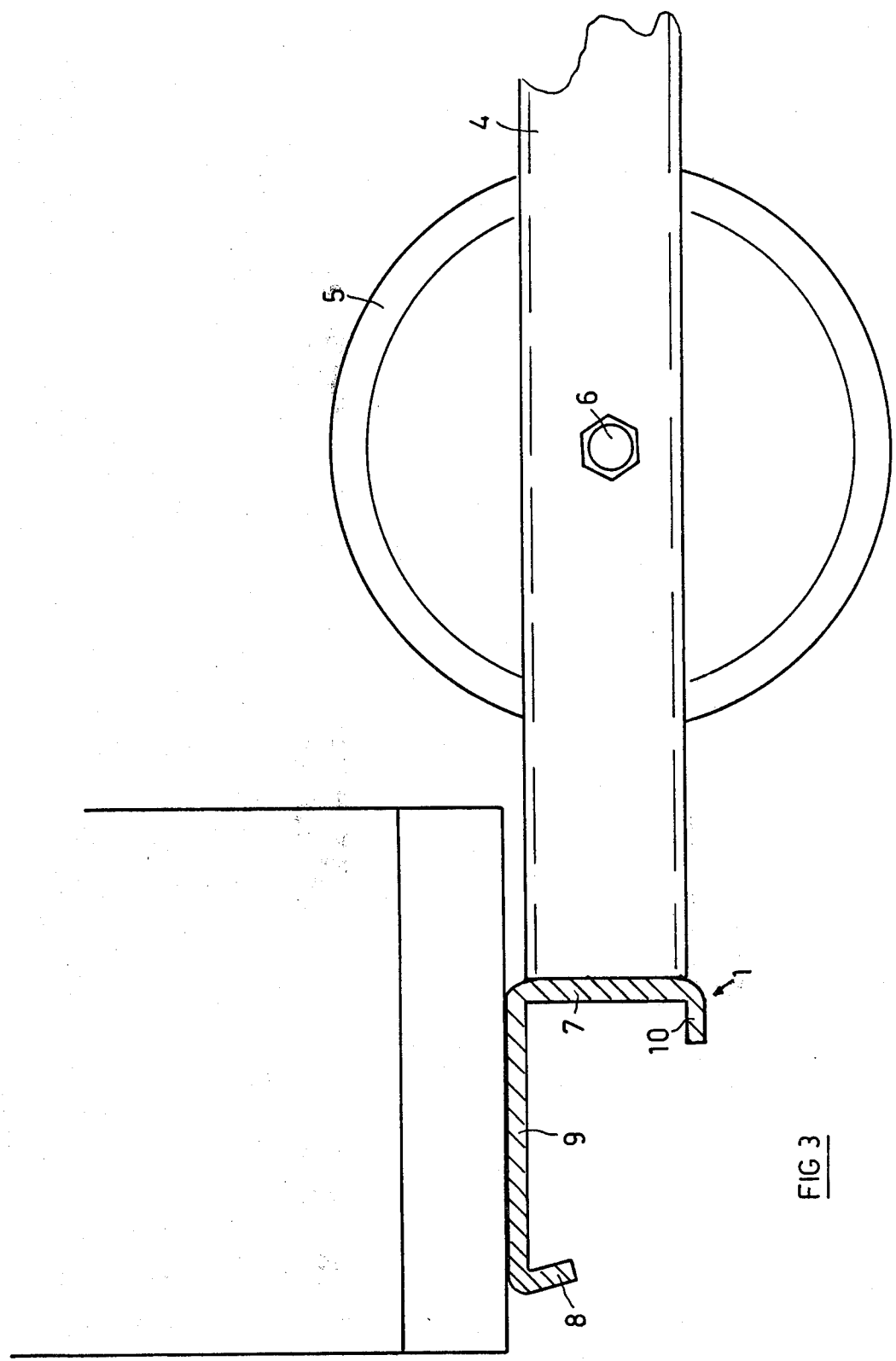
FIG. 3 is an enlarged fragmentary detail of part of the rolling support of FIGS. 1 and 2.

The shape of the two transverse traverse members 1 and 2 can be seen from FIG. 3. They are substantially inverted U-sections wherein each has a U part in the form of a shorter limb 8 and a longer limb 7. The longer limb 7 is connected to the longitudinal struts 3 and 4, while the short limb 8 lies at the other end of base 9 of the section. Situated at the free end of the longer limb 7 is an extension 10 which protrudes perpendicularly towards the interior of the U-section. The shorter limb 8 forms, with the base 9 of the U-section, an angle which is less then 90°, preferably about 70° to 80°.

Figure 4:
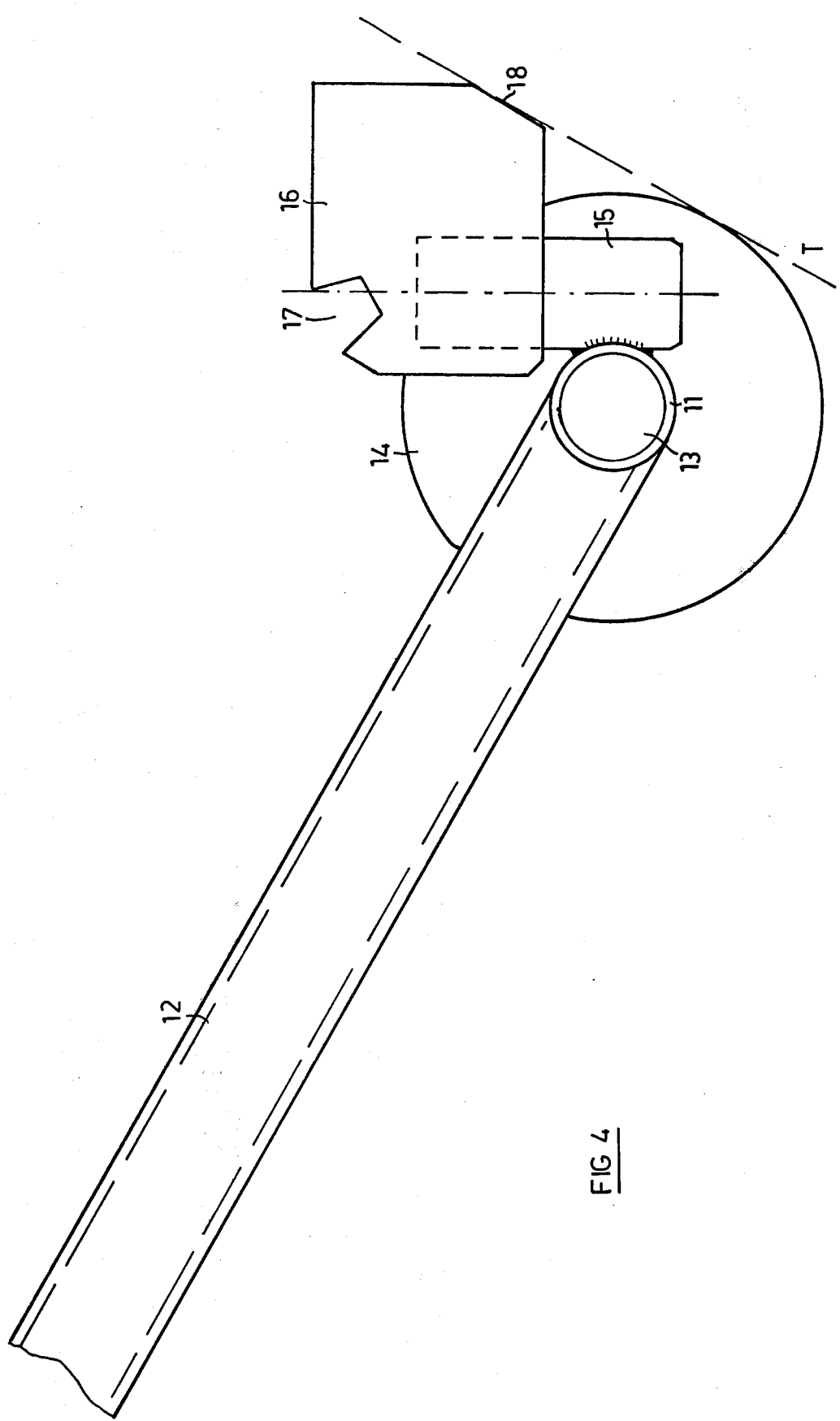
FIG. 4 is a fragmentary side elevation of the drawbar of the said embodiment.
Figure 5:
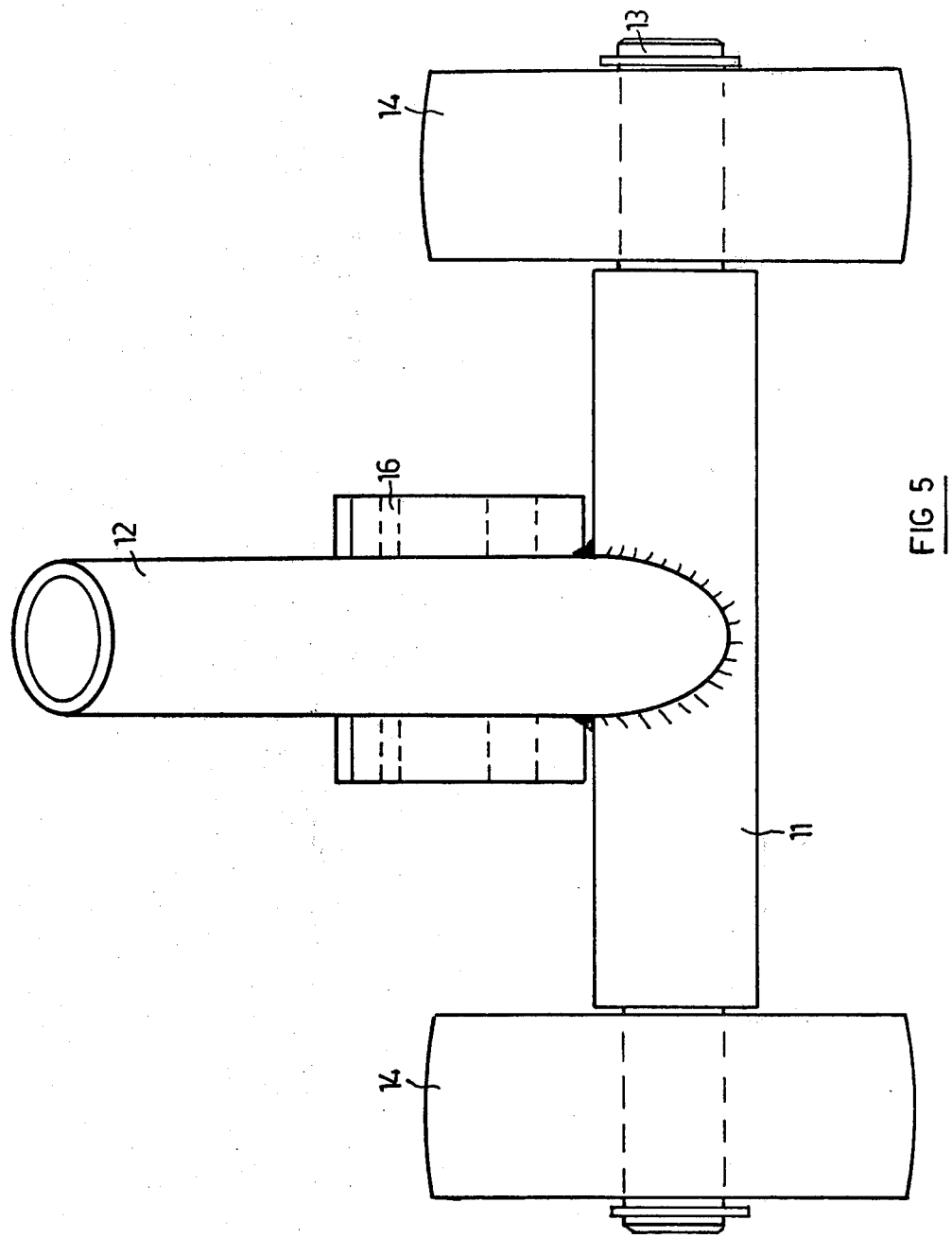
FIG. 5 is a partial front view of the drawbar.

The construction of the drawbar can be seen from FIGS. 4 and 5. Fastened to a supporting tube 11 is a manoeuvering lever 12 which has a length of about 100 to 120 cm. The supporting tube 11 receives a shaft 13 at each end of which is a rotatable roller 14. Moreover, a shaft journal 15 is fastened in such a way to the supporting tube 11 that is forms a right angle with the rotational axis of the rollers 14, and that it forms an angle of about 60° with the manoeuvering lever 12. This shaft journal 15 can, for example, be welded securely to the supporting tube 11 and serves for the reception of a coupling piece 16. The latter has a substantially cubic shape and is mounted so as to be easily rotated on the shaft journal 15. The external dimensions of the coupling piece 16 correspond approximately to the clear inside cross-section of the cross members 1 and 2.

The upper edge of the coupling piece 16, which is turned to the manoeuvering lever 12, is bevelled and provided with a groove 17. The swivel axis of the coupling piece 16 on the shaft journal 15 also extends through this groove 17. The groove 17 is intended for the reception of the shorter limb 8 of one or the other of the cross traverses 1 and 2, as will be described in yet more detail later on.

Figure 6:
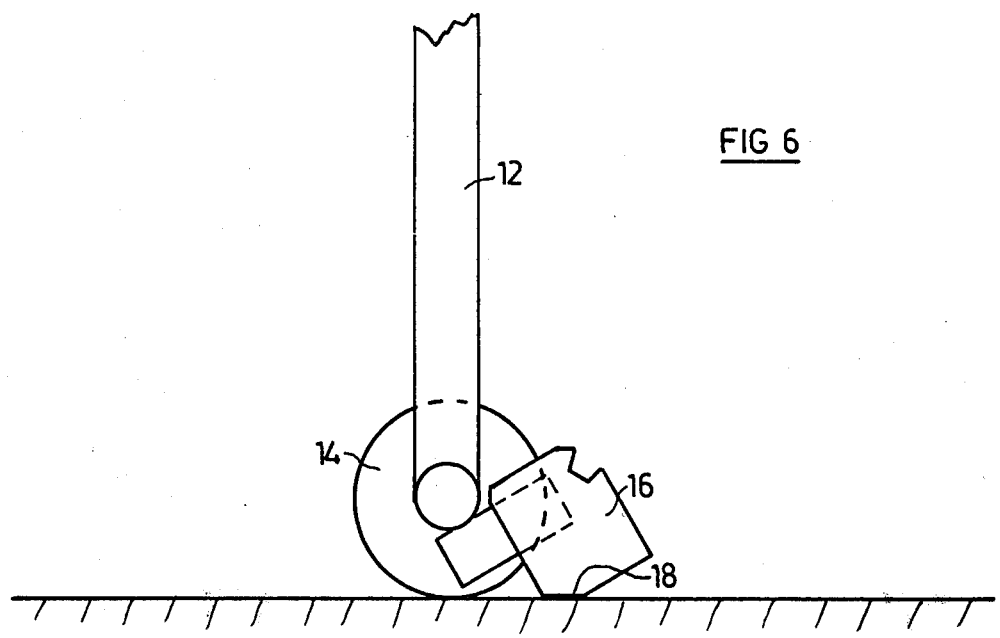
FIG. 6 is a partial side view, to a reduced scale, showing the drawbar in the set-down state.

The edge of the coupling piece 16 which lies diametrically opposite the aforesaid edge, i.e. that lower edge of the coupling piece which is averted from the manoeuvering handle, is bevelled to form a bearing surface 18. This surface 18 lies in plane T which is tangential to the rollers 14 of the drawbar. The direction of this bevelling 18 is immediately clear from FIG. 6 from which it will be seen that in the set-down state of the drawbar, said drawbar is supported by the bevel 18 and thus assumes a stable disposition.

Figure 7:
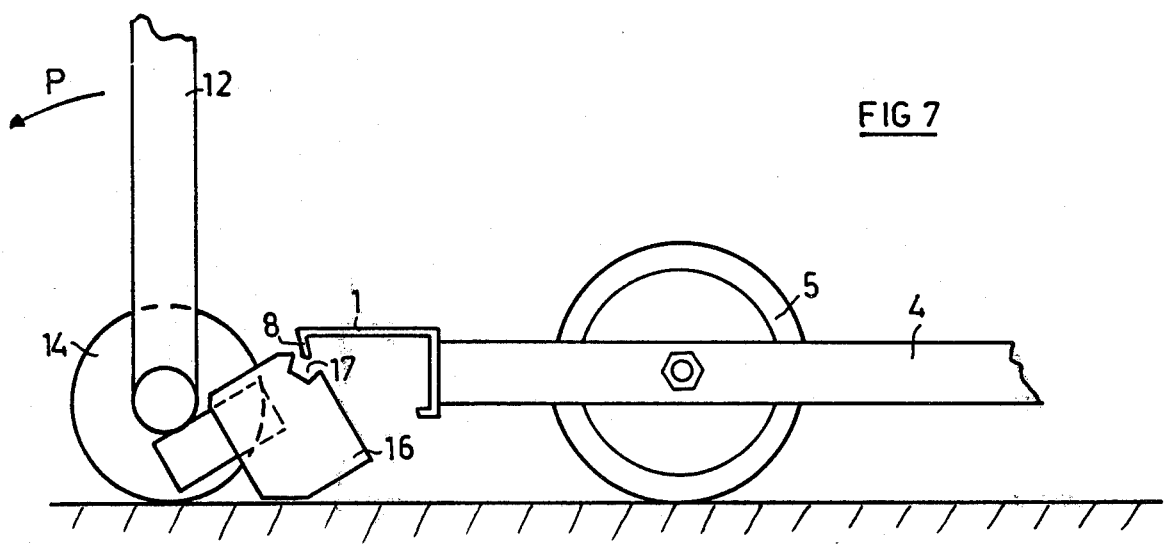
FIG. 7 is a view comparable with FIG. 6, but showing the drawbar in position ready for coupling up to the rolling support.
Figure 8:
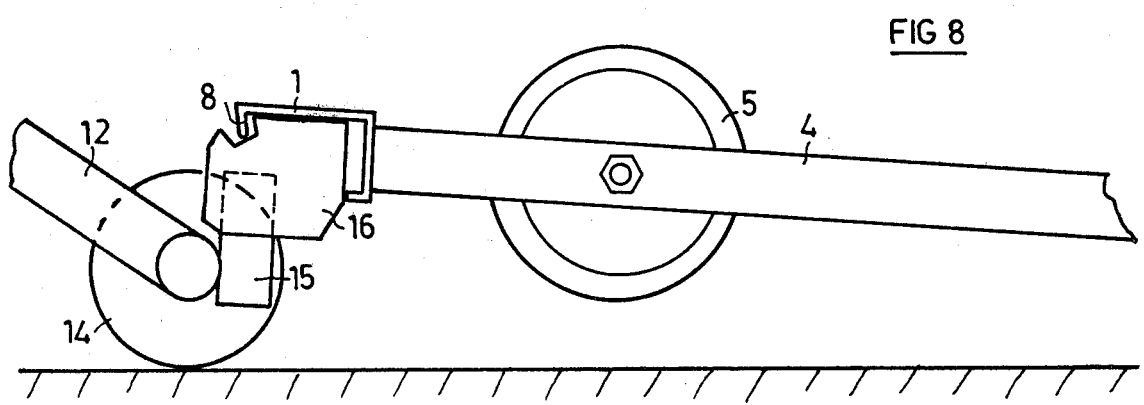
FIG. 8 is a view similar to FIG. 7, but showing the drawbar coupled up to the support.

FIG. 7 shows the rolling support resting with its rollers 5 on the floor 19, this support being required to be moved into a different position. For this purpose, the drawbar described in the foregoing is brought into the position, evident in FIG. 7, in which it is disposed under one of the cross traverses, in the present example under the cross traverse 1. The disposition of the drawbar, ready for coupling to the rolling support corresponds approximately to the set down position, shown in FIG. 6, of the drawbar. It should be pointed out that during attachment of the drawbar the maneuvering lever 12 assumes a substantially vertical position and thus its manipulation is not hindered by any load built up on the rolling support. The short titled limb 8 of the U-section 1 is positioned directly over the groove 17 in the coupling piece 16. Thereupon, the manoeuvering lever 12 is swung in the direction of the arrow P, until the position shown in FIG. 8 is reached. It can clearly be seen how, as a result, the coupling piece 16 engages into the interior of the U-section 1, and the shorter limb 8 enters into the groove 17 and is located therein in self-locking manner as a result of its obliquity.

As soon as the position of FIG. 8 is reached, the rolling support can be manoeuvered virtually effortlessly. Because of the wing like mounting of the coupling piece 16, travel around very tight curves is possible, providing for simple manoeuverability of the loaded rolling support even in the narrowest spaces. Slipping-down of the rolling support from the drawbar is not possible, since the design of the groove 17, with its bevelled side wall, is such as to hold the correspondingly bevelled limb 8 of the U-section 1 all the more securely the greater the tractive force on the drawbar. By appropriate selection of the lever arm ratio, the result can be achieved that the pressure which is exerted in the vertical direction on the coupling piece, and which is reflected in a torque at the axis 13 of the rollers 14, is compensated for by the torque which is exerted by the weight of the manoeuvring lever on the axle 13. Advantageously there can be mounted at the free end of the manoeuvring lever 12, a handle (not shown) which extends perpendicularly thereto and which can possible be provided with a weight for the additional compensation of the torque which is exerted by the laden rolling support.

What I claim is:

1. A mobile storage and transport unit for use in a shelf storage system comprising:
    a first part comprising a four wheeled roller unit having a four sided right angled frame supported by two pair of rotatable wheel supports disposed at opposite sides respectively of said frame;
    a second part comprising a drawbar provided with a pair of drawbar rollers and elongated drawbar coupling means adapted to be coupled to said four sided frame of said first part;
    the frame of said first part comprising two pair of longitudinal struts and two cross members rigidly connected to form said four sided right angled frame, the respective wheel supports being disposed between the respective pair of longitudinal struts, said two cross members being formed by an inverted U-section having limbs of unequal length;
    said coupling means having a member which is substantially cubic in shape and which is provided with a groove for reception of said shorter limb of said U-section;
    said coupling means being further provided with pivotal means to rotate said drawbar about an axis perpendicular to the axis of rotation of the pair of rollers constituting the rotatable supports; and
    the shorter limbs of the U-sections lying on the sides away from the four sided frame forming an angle of between 70 degrees and 80 degrees to enhance pivotal swingability of the coupling member about said axis which is perpendicular to the axis of rotation of the drawbar rollers.

2. A mobile storage and transport unit as claimed in claim 1 in which said longitudinal struts are set in relative to the ends of said U-sections.

3. A mobile storage and transport unit as claimed in claim 1 in which said shorter limbs of said U-sections lie on the side away from the four sided frame.

4. A mobile storage and transport unit as claimed in claim 3 in which the longer limbs bear, at their free ends, a perpendicularly projecting extension directed towards the interiot of said U-sections.

5. A mobile storage and transport unit as claimed in claim 1 in which said drawbar comprises an axle tube for reception at one end of the roller shaft to which said tube is secured and a manoeuvering lever protruding perpendicularly therefrom, said axle tube having a shaft butt on the other end for engagement of said coupling member.

6. A mobile storage and transport unit as claimed in claim 5 in which said manoeuvering lever and said shaft butt form an angle of about 60 degrees with each other.

7. A mobile storage and transport unit as claimed in claim 6 in which said groove in said coupling member is located at the upper edge thereof and is turned towards said manoeuvering lever with the swivel axis of said coupling member extending through said groove.

8. A mobile storage and transport unit as claimed in claim 7 in which the lower edge of said coupling member which is averted away from the manoeuvering lever of the coupling member is provided with a bevelled surface.

* * * * *